United States Patent [19]
Kuzuya et al.

[11] Patent Number: 4,795,120
[45] Date of Patent: Jan. 3, 1989

[54] SUPPORTING APPARATUS FOR MOVABLY SUPPORTING AN ATTACHMENT APPARATUS RELATIVE TO A BASIC APPARATUS

[75] Inventors: Susumu Kuzuya, Gifu; Minoru Sakanobe, Komaki; Yukihito Takagi, Nagoya; Nobuaki Oku, Nagoya; Toyonori Sasaki, Nagoya; Kazuyoshi Sagawa, Ogaki, all of Japan

[73] Assignee: Brother Kogyo Kabushiki Kaisha, Nagoya, Japan

[21] Appl. No.: 73,262

[22] Filed: Jul. 14, 1987

[30] Foreign Application Priority Data

Jul. 15, 1986 [JP] Japan ................. 61-165772

[51] Int. Cl.$^4$ .............................. A47F 5/00
[52] U.S. Cl. .................... 248/289.1; 16/115; 74/522; 74/525; 248/131; 248/1 G; 403/18
[58] Field of Search ............ 248/289.1, 1 H, 652, 248/662, 665, 664, 131; 403/18, 4, 322, 325; 16/115; 292/336.3, 173; 74/525, 522

[56] References Cited

U.S. PATENT DOCUMENTS 2,939,364  6/1960  Doswell et al. ............ 248/289.1 X
3,090,399  5/1963  Godshalk .................... 74/522 X
3,988,802  11/1976  Bruni et al. ..................... 16/115
4,437,638  3/1981  Schiebenpflug .

FOREIGN PATENT DOCUMENTS

57-27774  2/1982  Japan .
430100  8/1967  Switzerland ........................ 403/4
1154832  6/1969  United Kingdom .
1177574  1/1970  United Kingdom .
1323861  7/1973  United Kingdom .
2057100  3/1981  United Kingdom ................. 74/525
2181484  4/1987  United Kingdom .

Primary Examiner—Alvin C. Chin-Shue
Assistant Examiner—David L. Talbott
Attorney, Agent, or Firm—Jones, Tullar & Cooper

[57] ABSTRACT

A supporting apparatus for moving an attachment apparatus, such as a display apparatus, relative to a basic apparatus, such as a printing apparatus, to a desired position for an operator. A vertical shaft for supporting the display apparatus can be shifted from an engaging position to a release position by the rocking operation of an operation member around its supporting shaft through a pivot pin projecting from the bottom portion of the vertical shaft. At the release position, the vertical shaft is allowed free rotation, which in turn sets the display apparatus to the desired swivel position. At the engaging position, a swivel positioning means is enabled so as to prevent the rotation of the vertical shaft, thus fixing the display apparatus at the set swivel position.

5 Claims, 6 Drawing Sheets

_SUPPORTING APPARATUS FOR MOVABLY SUPPORTING AN ATTACHMENT APPARATUS RELATIVE TO A BASIC APPARATUS_

BACKGROUND OF THE INVENTION

The present invention relates to a supporting apparatus which movably supports an attachment apparatus, such as a display apparatus for text editing, on a basic apparatus, such as a printing apparatus or a word processing apparatus or station, and more particularly, to a supporting apparatus which permits the attachment apparatus to be movable to the proper position for an operator relative to the basic apparatus.

Figure 1:
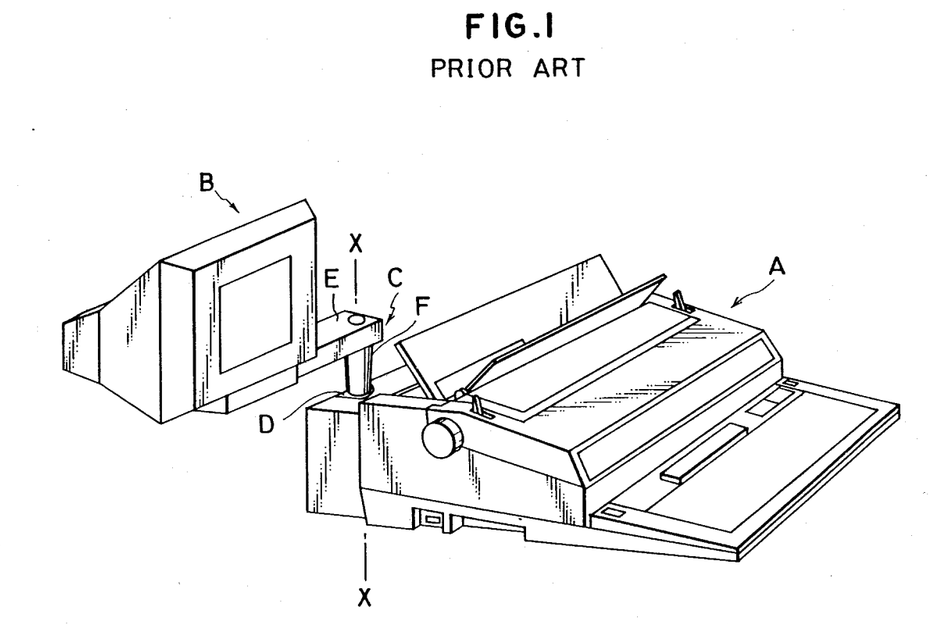
FIG. 1 is an external perspective view of a printing apparatus mounted with a display apparatus through a prior art supporting apparatus.

The supporting apparatus of this type has a structure as shown in FIG. 1 in which at attachment apparatus B (e.g., a display apparatus) is fastened to a basic apparatus A (e.g., a printing apparatus) by a supporting apparatus C. More specifically, a holder D is provided on one side of the rear portion of the printing apparatus A, and a vertical shaft or upstanding column F is fitted in the holder D in such a way as to be swivelable around the longitudinal axis X—X of the holder D. A horizontal swivel arm E, which supports at one end the display apparatus B, is fixed at its base section to the vertical shaft F. The display apparatus B can be moved to a proper position for the operator's view by swiveling the swivel arm E together with the vertical shaft F around the axis X—X.

The prior art supporting apparatus is disclosed in U.S. Pat. No. 4,437,638 to Scheibenpflug.

According to the supporting apparatus with the above-described structure, holding the display apparatus B at the moved position depends on the friction between the vertical shaft F and the holder D. This friction therefore determines the swiveling position of the arm E.

To allow the operator to smoothly move the display apparatus B to the desired position, the smaller the friction, the better the operation. However, the reduction in friction also decreases the force needed to secure the display apparatus B at the moved position. Accordingly, the display apparatus B is more likely to easily move around by a small force, such as the operator's accidental touch to the display apparatus B or by the possible vibration of the printing apparatus A in use.

On the other hand, if the aforementioned friction is increased to more securely hold the display apparatus B at any moved position, the operator would need greater force to move the display apparatus B to a different position, thus hindering a smoother moving operation.

SUMMARY OF THE INVENTION

With the above situation in mind, it is an object of this invention to solve the above-mentioned problems of the conventional supporting apparatus and thus to provide a supporting apparatus which permits an attachment apparatus to be moved to any desired position at ease and to be secured at the moved position.

This object is achieved by providing a supporting apparatus in which, when engaged with a vertical shaft for swivelably supporting the attachment apparatus around the axis of the vertical shaft, an operation member vertically shifts the vertical shaft between an engaging position and a release position; and when the vertical shaft is at the engaging position, swivel positioning means is enabled to swivel the attachment apparatus around the axis of the vertical shaft to a desired position and position the attachment apparatus there, and in order to move the attachment apparatus to a different position, the swivel positioning means is disabled by shifting the vertical shaft to the release position from the engaging position using the operation member.

With the above structure, the attachment apparatus can be freely swiveled with a significantly small friction, and, once positioned at any position, the attachment apparatus can be securely held there by the swivel positioning means. This prevents the attachment apparatus from being undesirably moved around by the vibration of the basic apparatus in use (which is prominent when the basic apparatus is a printer) or by an operator's possible accidental touching of the attachment apparatus.

The above structural feature also prevents the attachment apparatus from being undesirably swiveled from its secured position by the operator's touching of the attachment apparatus for its tilting or swiveling operation in the case where the attachment apparatus is mounted on a swivel arm through a tilt-swivel mechanism.

According to a preferred embodiment of this invention, a pivot pin is provided at a bottom portion of the vertical shaft to be engageable with the operation member. The engaging end of the pivot pin has a hemispheric shape which permits the pivot pin to have a substantially pin contact with the operation member. The operation member is swivelable around its support shaft and has two arms, one engaged with the pivot pin and the other operable by the operator.

With this arrangement, in the case where the vertical shaft is shifted up to the release position through the pivot pin by the rocking action of the operation member, the vertical shaft is supported by the engagement of the operation member with the pivot pin, thus allowing for a smoother swiveling operation of the attachment apparatus.

According to another preferred embodiment, the operation member comprises an operation lever pivotally mounted on the fixed support shaft and a slider provided to be slidable in the lengthwise direction of the operation lever. When the operation member is swiveled, the slider is slid to an extraction position.

With this arrangement, the operation section of the operation member, which is operated by the operator when needed, is normally held at a retraction position where it does not project outward from an outer cover for the vertical shaft and holder means. This prevents the operator from accidentally touching the operation section and improves the external artistic impression. Moreover, when the operation member is swiveled, the leverage of the operation member with the support shaft as its operational center is increased by sliding the slider to the extraction position, i.e., by effectively utilizing the principles of the lever, thus ensuring a smoother vertical movement of the vertical shaft.

BRIEF DESCRIPTION OF THE DRAWINGS

The foregoing objects and many of the attendant advantages of this invention will become more readily appreciated as the same becomes better understood by referring to the following detailed description when taken in conjunction with the accompanying drawings wherein.

DESCRIPTION OF THE PREFERRED EMBODIMENTS

The first embodiment of this invention is illustrated in FIGS. 2 through 5.

Figure 2:
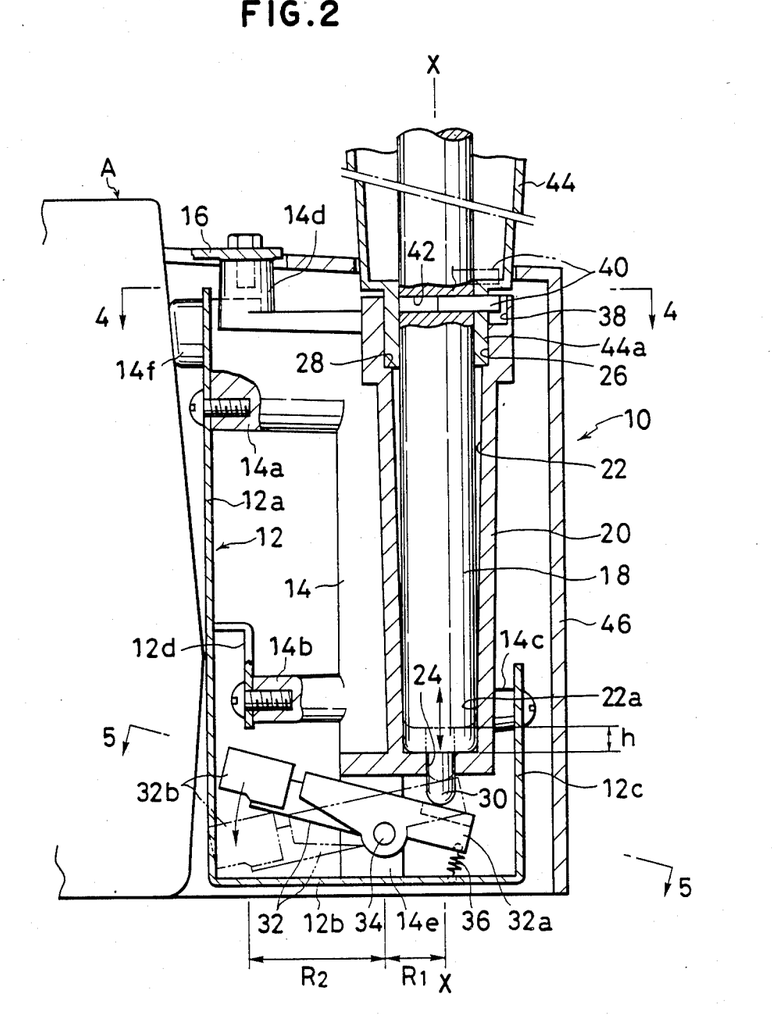
FIG. 2 is a vertical sectional view of that portion of a supporting apparatus according to a first embodiment of this invention which is to be connected to a basic apparatus.

In FIG. 2, a supporting apparatus 10 to which this invention is directed is arranged at the rear end portion and the rear wall of a printing apparatus A which is the basic apparatus. The supporting apparatus 10 is mounted on the printing apparatus A by means of a rear frame 12 that is fixed to the printing apparatus A by a known coupling means.

The rear frame 12 comprises a vertical frame portion 12a extending along the rear wall of the printing apparatus A, a bottom frame portion 12b extending rearward from the bottom of the vertical frame portion 12a, an upstanding frame portion 12c extending upward from the distal end of the bottom frame portion 12b, and a hooking ear 12d shaped into a hook and extending from a middle portion of the vertical frame portion 12a.

The supporting apparatus 10 comprises a housing 14, which has attaching portions 14a, 14b and 14c projecting therefrom. The attaching portions 14a, 14b and 14c are respectively fixed to the vertical frame portion 12a, hooking ear 12d and upstanding frame portion 12c of the rear frame 12 by means of bolts. The housing 14 is also provided with a pair of attaching portions 14d (see FIG. 4) which are bolted to a fitting 16 fixed to the printing apparatus. The bolting installation securely fixes the housing 14 to the rear frame 12. The housing 14 is further provided with a pair of legs 14e projecting from the bottom thereof and a contacting portion 14f projecting from one side of the top portion of the housing. The legs 14e tightly contact the bottom frame portion 12b, while the contacting portion 14f tightly contact the rear wall of the printing apparatus A, thus further securing the mounting of the housing 14 on the printing apparatus.

The housing 14 and the attaching portions 14a–14d, legs 14e and contacting portion 14f are integrally formed of a light aluminum alloy material by a die casting method.

The housing 14 is integrally formed with a holder 20 which holds a vertical shaft 18 in such a way that the vertical shaft is vertically shiftable along the vertical axis X—X thereof. The holder 20 has a vertical bore 22 formed along the axis X—X through which the vertical shaft 18 is fitted, and a through hole 24 formed in the bottom of the holder. The vertical bore 22 has a bottom portion 22a having the same inner diameter over a predetermined length or height from the bottom of the holder 20, and its inner diameter becomes wider upward, providing a tapered shape. A step 28 is formed between the upper portion of the tapered bore and the bottom portion of a bearing bore 26, which has a greater diameter than the upper portion of the tapered bore.

The vertical shaft 18, which is fitted through the vertical bore 22, has a pivot pin 30 integrally provided at its lower portion and projecting therefrom. The pivot pin 30 projects downward through the through hole 24 and has its distal end formed in a hemispheric shape to provide a pin contact with an operation member 32 that will be described later.

The operation member 32 is swivelably supported on the leg pair 14e through a support shaft 34, and has two arms 32a and 32b. The arm 32a has an engaging portion to engage with the pivot pin 30 and is connected with a coil spring 36, which is also attached to the bottom frame portion 12b so as to urge the operation member 32 in one direction. The other arm 32b is provided with a grip which an operator depresses in the arrow direction when needed.

The operation member 32 is normally held at the illustrated original position against the force of the spring 36 by a proper stopper (not shown). At this original position, the engaging portion of the arm 32a lightly contacts the pivot pin 30 so as not to push up the vertical shaft 18 above the descended position or the engaging position indicated by the solid line in FIG.2.

When the operation member 32 is rotated, by the opeator, couterclockwise as indicated by the arrow from the original position to the depressed position indicated by the chain line, against the force of the spring 36, the vertical shaft 18 is shifted up via the pivot pin 30 by a height h from the descended position or the engaging position to the ascended position or the release position. During the shifting, the vertical shaft 18 is guided by the bottom portion 22a having the same diameter throughout its height.

The top of the holder 20 is formed with a plurality of engaging recess portions 38 for shaft positioning. An engaging pin 40, which corresponds to these engaging recess portions 38, is forced in a pin hole 42 formed in a radial direction of the vertical shaft 18 so as to be fixed thereto, and has its one end projecting to engage with the engaging recess portions 38. The engaging recess portions 38 and the engaging pin 40 constitute swivel positioning means to position the vertical shaft 18 to a swivel position around the axis X—X.

A taper-shaped shaft cover 44, which is formed of a synthetic resin, has a lower portion 44a fixedly fitted over the vertical shaft 18 and is shifted upward or downward together with the vertical shaft. The pin 40 projects outside through the lower portion 44a. The lower portion 44a engages with the step 28 to be in a rest state when the vertical shaft 18 is at the descended or engaging position.

Reference numeral 46 denotes an outer cover for covering the rear frame 12 and the holder 20. This outer cover 46 is mounted on the printing apparatus A by a proper attaching means (not shown). The operation section 32b of the operation member 32 is not covered by the cover 46 so that it is easily and externally accessed by the operator.

Figure 3:
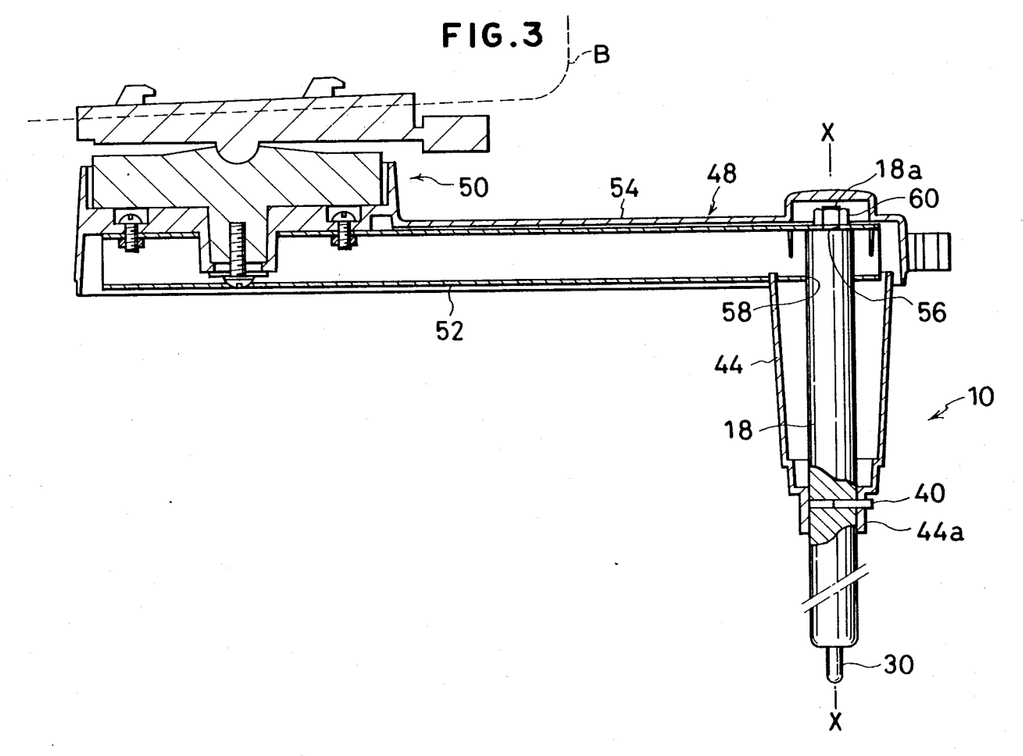
FIG. 3 is a vertical sectional view of that portion of the supporting apparatus according to the first embodiment of this invention which is to be connected to an attachment apparatus.

In FIG. 3, a swivel arm 48 is fixed at the base portion to the top of the vertial shaft 18, and its other end or free end extends in the horizontal direction perpendicular to the vertical shaft 18 and supports a display apparatus B as the attachment apparatus, indicated by the broken line, through a tilt-swivel mechanism 50. Consequently, the display apparatus B can be swiveled with the swivel arm 48 around the axis X—X of the vertical shaft 18. The tilt-swivel mechanism 50 causes the display apparatus B to be tilted or swiveled relative to the arm 48. This type of tilt-swivel mechanism is well known, as disclosed in the aforementioned U.S. Pat. No. 4,437,638.

The swivel arm 48 has an arm frame 52 made of a cylindrical square metal pipe and an arm cover 54 made of a synthetic resin.

The top portion of the vertical shaft 18 is fitted through top and bottom fit holes 56 and 58 which are formed at the proximal end of the arm frame 52 and are rigidly mounted on the frame 52 by tightening a nut 60 a screw end portion 18a. Therefore, the swivel arm 48 is swivelable together with the display apparatus B with the vertical shaft 18 around the axis X—X, and is also movable vertically along the axis X—X.

Figure 4:
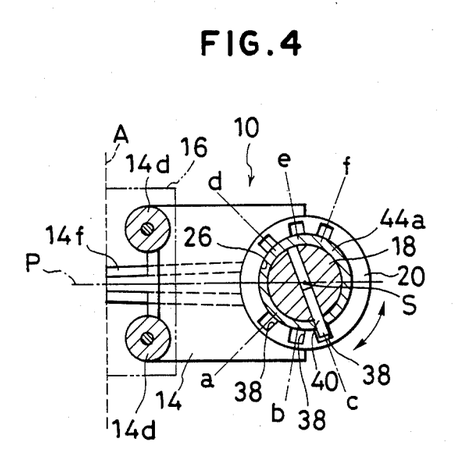
FIG. 4 is a transverse sectional view taken along line 4—4 in FIG. 2.

As shown in FIG. 4, with the contacting portion 14f of the housing 14 contacting the rear wall of the basic apparatus A, the supporting apparatus 10 has a symmetrical structure about the perpendicular line P, which passes through the center S of the vertical shaft 18 and extends to the rear wall of the basic apparatus A.

In this embodiment, the engaging recess portions 38 provided on the top portion of the holder 20 are arranged in such a manner that a total of six recess portions are symmetrical with respect to the center line P, three on one side of the line facing the remaining three on the opposite side. The pin 40 is slectively engageable with an arbitrary one of the six recess portions 38 positioned at a to f; the pin 40 is engaged with the recess portion 38 at position c in FIG. 4.

Figure 5:
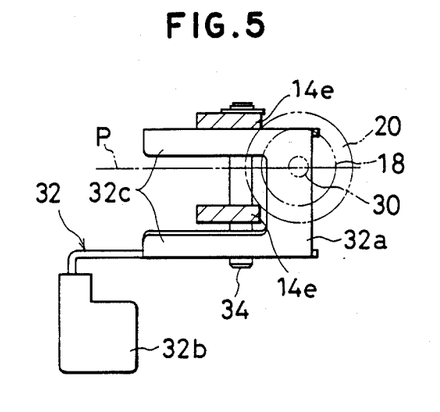
FIG. 5 is a view of an operation member as viewed from line 5—5 in FIG. 2.

As shown in FIG. 5, the operation member 32 is designed such that the arm 32a, which receives the pin 30 of the vertical shaft 18, is supported by the support shaft 32 at the U-shaped portion of the pair of legs 32c and is bridged between the pair of legs 32c. Therefore, the operation member 32 has sufficient strength to support the weights of the vertical shaft 18, the swivel arm 48 integral therewith and the display apparatus B.

The operation of the first embodiment having the above-described structure will now be explained.

When the vertical shaft 18 is at the engaging position indicated by the solid line in FIG. 2, the pin 40 engages with one of the recess portions 38 as shown in FIG. 4, preventing the shaft from rotating. Consequently, the display apparatus B is securely held so as not to swivel with respect to the basic apparatus A and is prevented from undesirably moving by the vibration of the printing apparatus A in use, or the like. Even in the case where the display apparatus is subjected, by the operator, to a fine adjustment such as tilting on the swivel arm 48 through the tilt-swivel mechanism 50, the swivel arm 48 itself is prevented from moving from the set swivel position.

To move the swivel arm 48 to a different position, the operation member 32 is rocked from the original position, as indicated by the chain line in FIG. 2, thus shifting up the vertical shaft 18 by a height h. Accordingly, the vertical shaft 18 is shifted to the release position where the pin 40 is disengaged from the recess portion 38 is indicated by the chain line, so that in this state the swivel arm 48 freely and smoothly swivels with the vertical shaft 18 around the axis X—X. When the pin 40 is positioned to a swivel position corresponding to a different recess portion 38, returning the operation member 32 to the original position causes the vertical shaft 18 to descend by its own weight to the engaging position at which the pin 40 engages with the different recess portion 38, and is held there so as not to swivel at the different swivel position.

Since the bottom portion of the pivot pin 30 is shaped to be semispheric to provide a substantially pin contact with the arm 32a of the operation member 32, the friction between the pin 30 and the arm 32a is small. As a result, the pivot pin 30 can smoothly move on the engaging surface of the arm 32a relative to the arm 32a, and when the vertical shaft 18 is at the release position, the pin 30 is supported by and is rotated at the contacting point between the pin 30 and the arm 32a, so as to be in a floating state with respect to the holder 20. Naturally, the pin 30 can rotate very lightly.

Further, since, as shown in FIG. 2, the operation member 32 is designed to have such a leverage that the arm length R1 from the support shaft 34 to the point of action of the pin 30, or the axis X—X, is about ½ of the arm length R2 from the support shaft 34 to the operation section 32b, the rocking action of the operation member 32 is smoothly performed using the principles of the lever.

A supporting apparatus according to the second embodiment of this invention will now be explained with reference to FIGS. 6 and 7. Reference numerals used for explaining the first embodiment are also used to denote corresponding portions of the second embodiment for ease of understanding. Therefore, the explanation of the corresponding portions will be omitted, thus avoiding the otherwise redundant description, and only those essential portions of the second embodiment which differ from the first embodiment will now be briefly explained.

The operation member 32 of the second embodiment comprises an operation lever 70, which is rockably supported by the support shaft 34 and engages with the pivot pin 30, and a slider 72 slidably engaged with the lever 70 in such a manner that the slider 72 can slide, as illustrate, from the retraction position indicated by the solid line to the position indicated by the chain line along the length of the lever 70.

Figure 6:
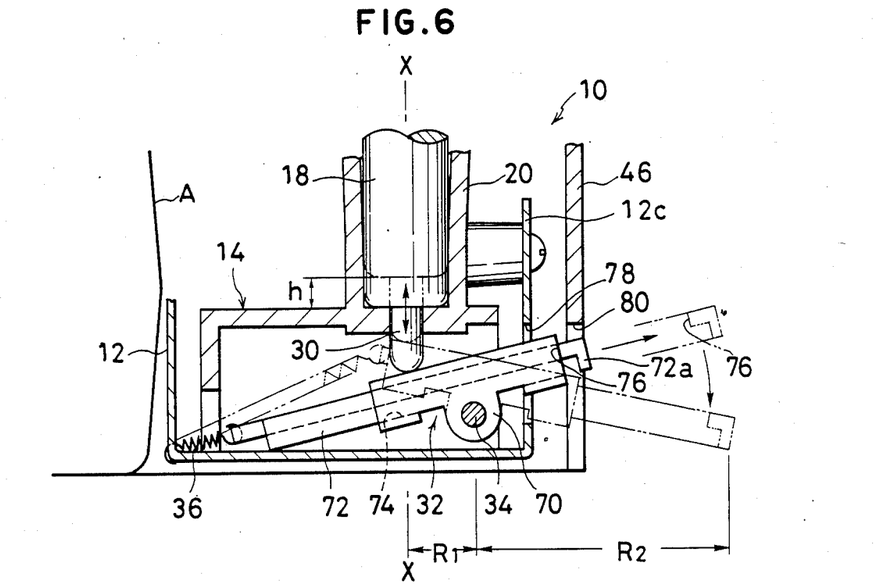
FIG. 6 is a vertical sectional view of the essential portion of a supporting apparatus according to a second embodiment of this invention.
Figure 7:
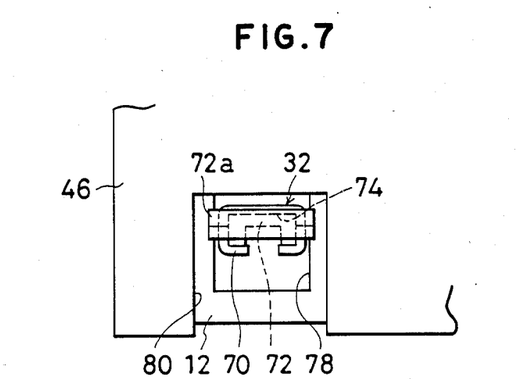
FIG. 7 is a fragmentary view from the right-hand side in FIG. 6.

The slider 72 is fitted in a bent guide path 74 of the operation lever 70, which is bent as shown in FIG. 7, and its internal end is coupled with a pulling spring 36. The slider 72 is held against the urging force of the spring 36 at the retraction position where a side portion 76 of an operation section 72a engages with the operation lever 70. At this position, the slider 72 is positioned not to substantially project outward from the outer cover 46, so that it is unlikely that the operation member 32 is rocked by accidental touching of the slider 72.

Windows 78 and 80 are respectively formed in the upstanding frame portion 12c of the rear frame and the outer cover 46 so as to prevent interference with the operation member 32. The operation section 72a of the slider 72 can be externally accessed through the window 80 of the outer cover 46.

To shift up the vertical shaft 18 from the descended or engaging position indicated by the solid line in FIG. 6 by a height h to the release position indicated by the chain line, the operator first extracts the slider 72 away from the support shaft 34 against the force of the spring 36, operating the operation section 72a and then depresses the slider. Consequently, the operation lever 70 rocks around the support shaft 34 with the slider 72, which in turn shifts the vertical shaft 18 up to the release position via the pivot pin.

As described above, at the time the operation member 32 is rocked, the arm length R2 is increased to be about three times the arm length R1 to provide a large leverage by extracting the slider 72, thus ensuring smoother and easier operation. What is more, the slider 72 is normally positioned at the retraction position so that it is protected by the outer cover, so that the possibility of undesirably touching the slider 72 can be avoided, and the external appearance of the supporting apparatus becomes simple and the artistic impression is improved.

Figure 8:
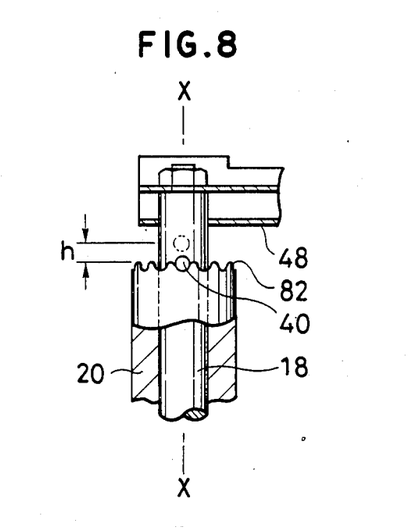
FIGS. 8 and 9 are fragmentary views of swivel positioning means according to different modifications, respectively.
Figure 9:
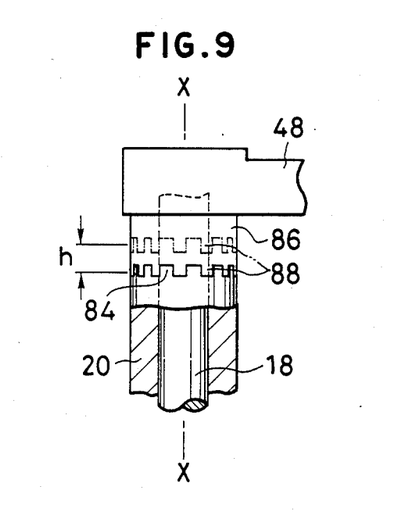

Modification of the swivel positioning means, as shown in FIGS. 8 and 9, respectively, will now be explained using the same reference numerals as used for the first and second embodiments to denote corresponding portions.

According to the modification shown in FIG. 8, an engaging gear portion 82 with wavy teeth is formed at the periphery of the top portion of the holder 20 with predetermined pitches between the teeth, and the pin 40 is engaged with the engaging gear portion 82. This engaging gear portion 82 serves as the engaging recess portions 38 of the first embodiment.

As the vertical shaft 18 is shifted upward by a height h from the illustrated engaging position, the pin 40 is also moved upward as indicated by the chain line to be disengaged from the engaging gear portion 82, thus allowing for a free rotation of the vertical shaft 18 around the axis X—X.

According to the modification shown in FIG. 9, an engaging gear portion 84 with rectangular teeth is formed at the periphery of the top portion of the holder 20, with predetermined pitches between the teeth, and a sleeve 86 with the same diameter as the holder 20 is concentrically fixed to the vertical shaft 18 on the side of the swivel arm 48, which is vertically movable with the vertical shaft 18. Another engaging gear portion 88 with rectangular teeth, which face and are respectively engageable with those of the engaging gear portion 84, is provided at the periphery of the sleeve 86.

This modification shows the design which does not need to use the aforementioned pin 40. The engaging gear portions 84 and 88 engage with each other in the illustrated engaging position indicated by the solid line, thus preventing the rotation of the vertical shaft 18 and the swivel arm 48. When the vertical shaft 18 is shifted upward by a height h from the engaging position, the engaging gear portion 88 is moved to the position indicated by the chain line so as to be disengaged from the engaging gear portion 84, thus permitting a free rotation of the vertical shaft 18 and the swivel arm 48 around the axis X—X.

The present invention is not limited to the above-explained embodiments and modifications; it can be modified in other forms as well without departing from the scope of this invention.

For instance, the pin 40 serving as the swivel positioning means may be provided on the side of the holder 20 while the engaging recess portions 38 and the engaging gear portion 82 may be provided on the side of the vertical shaft 18; this is a matter of design choice.

In the first embodiment, the attachment apparatus B is mounted on the swivel arm 48; however, the supporting apparatus of this invention may be designed such that the attachment apparatus B is directly mounted on the vertical shaft 18 without using the swivel arm 48.

What is claimed is:

1. A supporting apparatus for movably supporting an attachment apparatus relative to a basic apparatus, said supporting apparatus comprising:
    a vertical shaft for swivelably supporting said attachment apparatus around the axis of said vertical shaft, said shaft having a bottom portion;
    holder means, mounted on said basic apparatus, for holding said vertical shaft in such a manner that said vertical shaft is vertically movable along said axis thereof;
    an operation member for vertically shifting said vertical shaft between an engaging position and a release position;
    a pivot pin provided at the bottom portion of the vertical shaft and having and engaging end to be engaged with said operation member, said engaging end being formed in a hemispheric shape to provide substantially a pin contact with the operation member; and
    swivel positioning means for positioning said attachment apparatus to a desired position around said axis of said vertical shaft;
    said swivel positioning means including an engaging pin member which is fixed to said vertical shaft and extends along the radial direction of said axis of the vertical shaft, and a plurality of engaging recess portions which are formed on a top edge of said holder means and are arranged in a circular form around said axis of said vertical shaft so as to face said engaging pin member in such a manner that said engaging pin member is selectively engageable with said engaging recess portions when said vertical shaft is held in the engaging position, thereby enabling the swivel positioning means to lock the vertical shaft to positively prevent the attachment apparatus from swiveling; and
    said swivel positioning means being disabled when said vertical shaft is shifted by said operation member to the release position from the engaging position, thereby allowing the vertical shaft to freely rotate around the axis of the vertical shaft to swivel the attachment apparatus.

2. The supporting apparatus according to claim 1, wherein said operation member comprises a first arm rotatable around a fixed support shaft and engaged with said pivot pin, and a second arm positioned opposite to said first arm with said fixed support shaft therebetween and having an operation section to be operable by an operator.

3. The supporting apparatus according to claim 2, wherein an arm length from said support shaft of said operation member to said operation section of said second arm is greater than an arm length from said support shaft of said operation member to that engaging point of said first arm where said first arm is engaged with said pivot pin.

4. The supporting apparatus according to claim 1, wherein said operation member comprises an operation lever pivotally mounted on said fixed support shaft and engaged with said pivot pin of said vertical shaft, and a slider engaged with said operation lever to be slidable in the lengthwise direction of said operation lever, said lever having one end reserved as an operation section for an operator, whereby said slider can be slid away through said operation section thereof from said support shaft relative to said operation lever when said vertical shaft is shifted to said release position from said engaging position by said operation member; and wherein an outer cover for covering said vertical shaft and said holder means is provided, said outer cover having an opening which permits said slider to project outward from said outer cover, said slider being normally held at a retraction position where said slider does not substantially project through said opening of said outer cover.

5. The supporting apparatus according to claim 4, wherein when said slider is at an extraction position, an arm length from said operation section of said slider to said support shaft is greater than an arm length from an engaging point on said operation lever where said pivot pin is engaged therewith to said support shaft.

* * * * *